(No Model.)

C. W. POST.
COOKING UTENSIL.

No. 574,492. Patented Jan. 5, 1897.

Witnesses
Wm. F. Hemming
Wm. M. Rheem

Inventor
C. W. Post
by Elliott & Hopkins
Attys.

UNITED STATES PATENT OFFICE.

CHARLES W. POST, OF BATTLE CREEK, MICHIGAN.

COOKING UTENSIL.

SPECIFICATION forming part of Letters Patent No. 574,492, dated January 5, 1897.

Application filed December 4, 1895. Serial No. 570,988. (No model.)

*To all whom it may concern:*

Be it known that I, CHARLES W. POST, a citizen of the United States, residing in Battle Creek, county of Calhoun, and State of Michigan, have invented certain new and useful Improvements in Cooking Utensils, of which the following is a full, clear, and exact specification.

My invention relates more particularly to that class of cooking utensils known as "steamers," and it is especially designed for cooking cereals and other substances likely to collect at the bottom of the vessel or utensil in a more or less condensed mass.

The primary object of my invention is to subject the heart or interior as well as the surface of the substance to the direct action of the steam or heat, whereby the entire mass will be uniformly cooked.

With these ends in view my invention consists in certain features of novelty in the construction, combination, and arrangement of parts by which the said object and certain other objects hereinafter appearing are attained, all as fully described with reference to the accompanying drawings and particularly pointed out in the claims.

Figure 1:
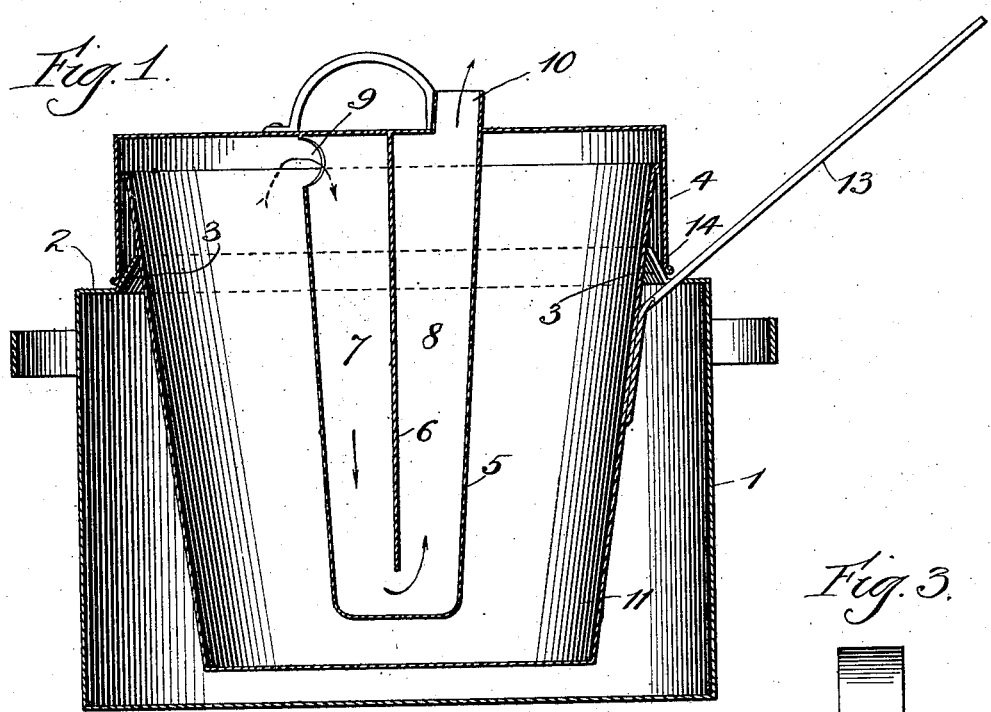
Figure 3:
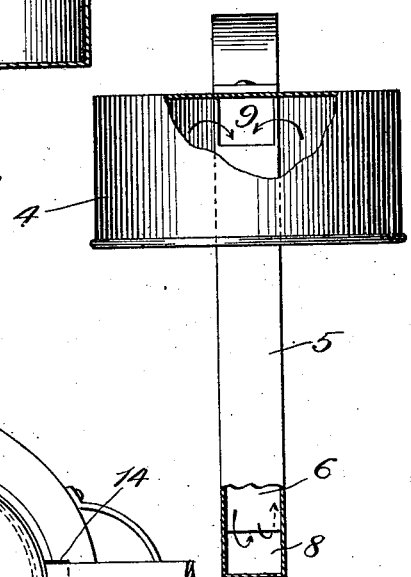
Figure 2:
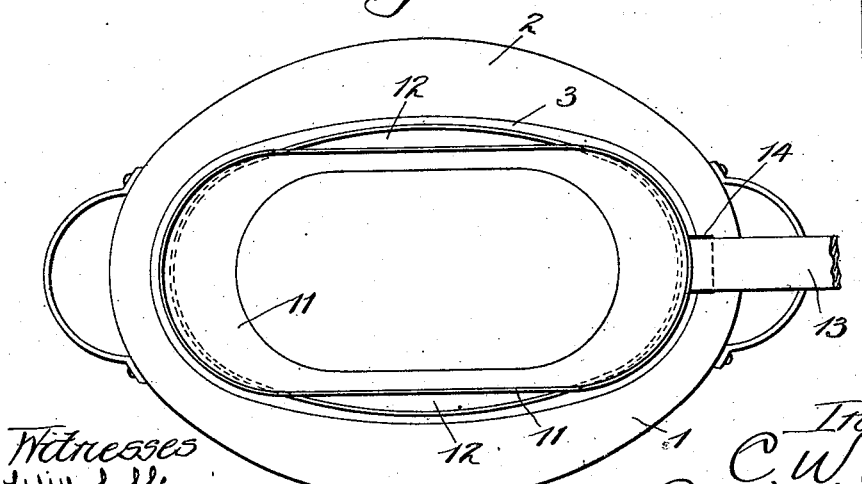

In the said drawings, Figure 1 is a vertical longitudinal section of my improved utensil. Fig. 2 is a plan view thereof with the cover and depending steam-passage removed; and Fig. 3 is a detail end view of the cover and depending steam-passage, partly broken away.

In carrying out my invention I employ an outer vessel or chamber 1, which contains the water and which is partially decked over the top by means of a rim 2. The inner edge of this rim 2 is surrounded by an upwardly-extending flange 3, which is for the purpose of forming a tight joint with a cover 4, fitting down over the flange 3 in the manner shown in Fig. 1 and completely closing the opening in the deck 2, the flange 3 being preferably inclined or tapered upwardly and inwardly, as shown in Fig. 1, so as to form a snug fit with the cover 4.

Depending from the cover 4 is a protuberant-like chamber 5, which extends to within a short distance of the bottom of the vessel 1 and is provided with a partition 6, which forms its interior into two upright passages 7 8, respectively, the passage 7 being provided at its upper end with a heat and steam inlet 9, while the passage 8 is provided through the cover 4 with a steam-outlet or spout 10.

Fitted within the vessel 1 and being preferably supported at a short distance from the bottom thereof is a second vessel 11, into which the chamber 5 depends and which is for the purpose of containing the cereal or other substance to be cooked and suspending the same within the water in the chamber 1 without causing the lower surface of the material to come into immediate contact with the stove or fire. This vessel 11 may be conveniently supported upon the flange 3, the vessel 11 being slightly funnel shape, so as to rest against the ends of the flange 3. The sides of the flange 3 are curved outwardly from the sides of the receptacle 11, whereby a slight space 12 on each side of the receptacle 11 is formed for the passage of the heat and steam from the vessel 1 up over the top of the receptacle 11, which terminates a short distance from the top of the cover 4.

The receptacle 11 may be provided with any suitable handle 13 and the deck 2 and flange 3 cut away, as shown at 14, Figs. 1 and 2, for the admission of such handle.

The food-receptacle 11 and preferably also the water vessel 1 are elliptical or elongated in plan view with a view to enabling the heat to more readily penetrate to the center of the mass being cooked than would be the case were such mass held in a circular receptacle.

It is of course obvious that the interior receptacle 11 may, if desired, be omitted when it is not necessary that the substance to be cooked be surrounded at the sides and bottom by water.

With a cooking utensil thus constructed it will be seen that the steam rising in the outer vessel 1 will pass up through the openings 12 over the top of the food-receptacle 11, in which latter the steam will collect and cook the surface of the material therein, and the heat and steam rising in the latter receptacle will pass through the opening 9 and descend in the passage 7 to the heart or interior of the cooking substance, and after passing under the lower end of the partition 8 finally discharges through the only exit 10 in the top of the cover. By this means the steam and heat are brought into close proximity or contact with not only the upper and outer surfaces of the cooking material, but are compelled to descend into the heart of the material before they can escape.

Having thus described my invention, what I claim as new, and desire to secure by Letters Patent, is—

1. A closed cooking utensil having a passage leading from the upper part of the interior thereof down into the body of the vessel or receptacle and then out through the upper part thereof, substantially as set forth.

2. A cooking utensil having in combination a vessel or receptacle and a passage for the discharge of steam, removably suspended therein and depending thereinto, and extending from the upper part thereof down into the body thereof, and thence up and out to the atmosphere, substantially as set forth.

3. A cooking utensil having in combination a vessel or receptacle, a cover closing the top of said vessel or receptacle and shutting off the escape of steam, and a steam-passage depending from said cover into said vessel and having an outlet through said cover, substantially as set forth.

4. A cooking utensil having in combination a vessel or receptacle, a cover closing said vessel or receptacle, a chamber secured to the under side of said cover and depending into said vessel and having a passage provided with an inlet at its upper end, communicating with the interior of the utensil, and a second passage communicating with the lower end of said first passage and having an outlet through said cover, substantially as set forth.

5. A cooking utensil having in combination an outer vessel, a second vessel suspended therein, a cover arranged over said second vessel and having a steam-passage depending into said second vessel and open to the admission of steam from said vessels and having an outlet through said cover, substantially as set forth.

6. A cooking utensil having in combination an outer vessel partially decked over and having a flange surrounding the inner edge of its deck, a second receptacle or vessel supported by said flange, said flange and second receptacle having a space between them for the ascension of steam and heat, a cover fitting over said flange, and having a steam outlet or passage depending into said second vessel and having a discharge-opening through the top of said cover, substantially as set forth.

7. A cooking utensil having in combination an outer vessel partially decked over, an inner receptacle supported through the opening in said deck, a cover arranged over said inner receptacle and deck and having its under side inclined whereby the water of condensation formed thereon will run back into said outer receptacle or vessel, and a steam-chamber depending from said cover into said second receptacle and having an inlet at its upper end below said cover, and an outlet through said cover, substantially as set forth.

8. A cooking utensil having in combination a water vessel or outer receptacle, a food vessel or inner receptacle whose plan section is of elliptical or oblong form, suspended in said outer vessel and being covered over, a steam vessel depending into said food-receptacle and having communication at one end with the upper part of both said food-receptacle and outer receptacle and at its other end with the external atmosphere through the cover of said food-receptacle, substantially as set forth.

CHARLES W. POST.

Witnesses:
NELSON E. HUBBARD,
C. H. SMITH.